(12) United States Patent
Chakam

(10) Patent No.: US 12,118,887 B2
(45) Date of Patent: Oct. 15, 2024

(54) COLLISION WARNING UNIT, MOBILE COMMUNICATIONS DEVICES AND METHOD FOR COLLISION WARNING

(71) Applicant: Continental Automotive GmbH, Hannover (DE)

(72) Inventor: Guy-Aymar Chakam, Saal an der Donau (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 17/724,076

(22) Filed: Apr. 19, 2022

(65) Prior Publication Data

US 2022/0335830 A1 Oct. 20, 2022

(30) Foreign Application Priority Data

Apr. 19, 2021 (DE) .................. 10 2021 203 838.7

(51) Int. Cl.
*G08G 1/16* (2006.01)
*G01S 13/02* (2006.01)
*G01S 13/931* (2020.01)

(52) U.S. Cl.
CPC .......... *G08G 1/16* (2013.01); *G01S 13/0209* (2013.01); *G01S 13/931* (2013.01)

(58) Field of Classification Search
CPC .......... G08G 1/16; G08G 1/005; G08G 1/166; G01S 13/0209; G01S 13/931; G01S 13/10
See application file for complete search history.

(56) References Cited

U.S. PATENT DOCUMENTS

| | | | |
|---|---|---|---|
| 2003/0015898 A1* | 1/2003 | Breed | B60R 21/01536 297/216.12 |
| 2007/0164896 A1* | 7/2007 | Suzuki | G01S 7/023 342/146 |
| 2016/0223651 A1* | 8/2016 | Kamo | G01S 13/426 |
| 2019/0299981 A1* | 10/2019 | Yoon | B60W 30/09 |
| 2020/0116856 A1 | 4/2020 | Roberts et al. | |
| 2020/0265719 A1* | 8/2020 | Swan | G08G 1/166 |

FOREIGN PATENT DOCUMENTS

| | | |
|---|---|---|
| CN | 107064921 B | 8/2017 |
| DE | 102012012965 A1 | 1/2013 |
| DE | 102019214796 A1 | 11/2020 |
| DE | 102020114277 A1 | 12/2020 |

OTHER PUBLICATIONS

Office Action dated Jul. 25, 2022 from corresponding German patent application No. 10 2021 203 838.7.

(Continued)

*Primary Examiner* — Daryl C Pope

(57) ABSTRACT

Disclosed is a collision warning unit configured to emit a detection signal into a surrounding area and to receive at least one signal component reflected at an object in the surrounding area, and, depending on the received signal component, to output a collision warning signal. The collision warning unit has a UWB (ultra-wideband) radar for transmitting the detection signal and receiving the reflected signal component.

13 Claims, 2 Drawing Sheets

(56) References Cited

OTHER PUBLICATIONS

Mercedes-Benz Group AG Presseerllaurung "Smartphone statt Autoschlüssel (Digitaler Fahrzeugschlüssel)" Presse-Information, 2 S.—URL: https://group-media.mercedes-benz.com/marsMediaSite/Media/47jm16EI0T1iVc7MSuxXy90AXz1a2oS9E1n9rpt0k15Erf9ol157NSCYCnAV41q31,_9904957/gd,de%7C4%7C5, abgerufen über https://group-media.mercedes-benz.com/marsMediaSite/de/instance/ko.xhtml?oid=9904957, abgerufen am Jul. 22, 2025, Jul. 13, 2015.

Mercedes-Benz Group AG Presseerllaurung "Smartphone statt Autoschlüssel (Digitaler Fahrzeugschlüssel)" [Machine translation], Presse-Information, 2 S.—URL: https://group-media.mercedes-benz.com/marsMediaSite/Media/47jm16EI0T1iVc7MSuxXy90AXz1a2oS9E1n9rpt0k15Erf9ol157NSCYCnAV41q31,_9904957/gd,de%7C4%7C5, abgerufen über https://group-media.mercedes-benz.com/marsMediaSite/de/instance/ko.xhtml?bid=9904957, abgerufen am Jul. 22, 2025, Jul. 13, 2015.

Praveen S. et al. "Miniature Radar for Mobile Devices", IEEE High Performance Computing Conference (HPEC), 2013, S 1-8, ISBN 978-1-4799-1365-7.

Office Action dated Dec. 22, 2021 from corresponding German patent application No. 10 2021 203 838.7.

Office Action dated Apr. 11, 2022 from corresponding German patent application No. 10 2021 203 838.7.

\* cited by examiner

COLLISION WARNING UNIT, MOBILE COMMUNICATIONS DEVICES AND METHOD FOR COLLISION WARNING

BRIEF DESCRIPTION OF THE DRAWINGS

An exemplary embodiment of the disclosure is described below, with reference to the figures, in which.

DETAILED DESCRIPTION

Figure 1:
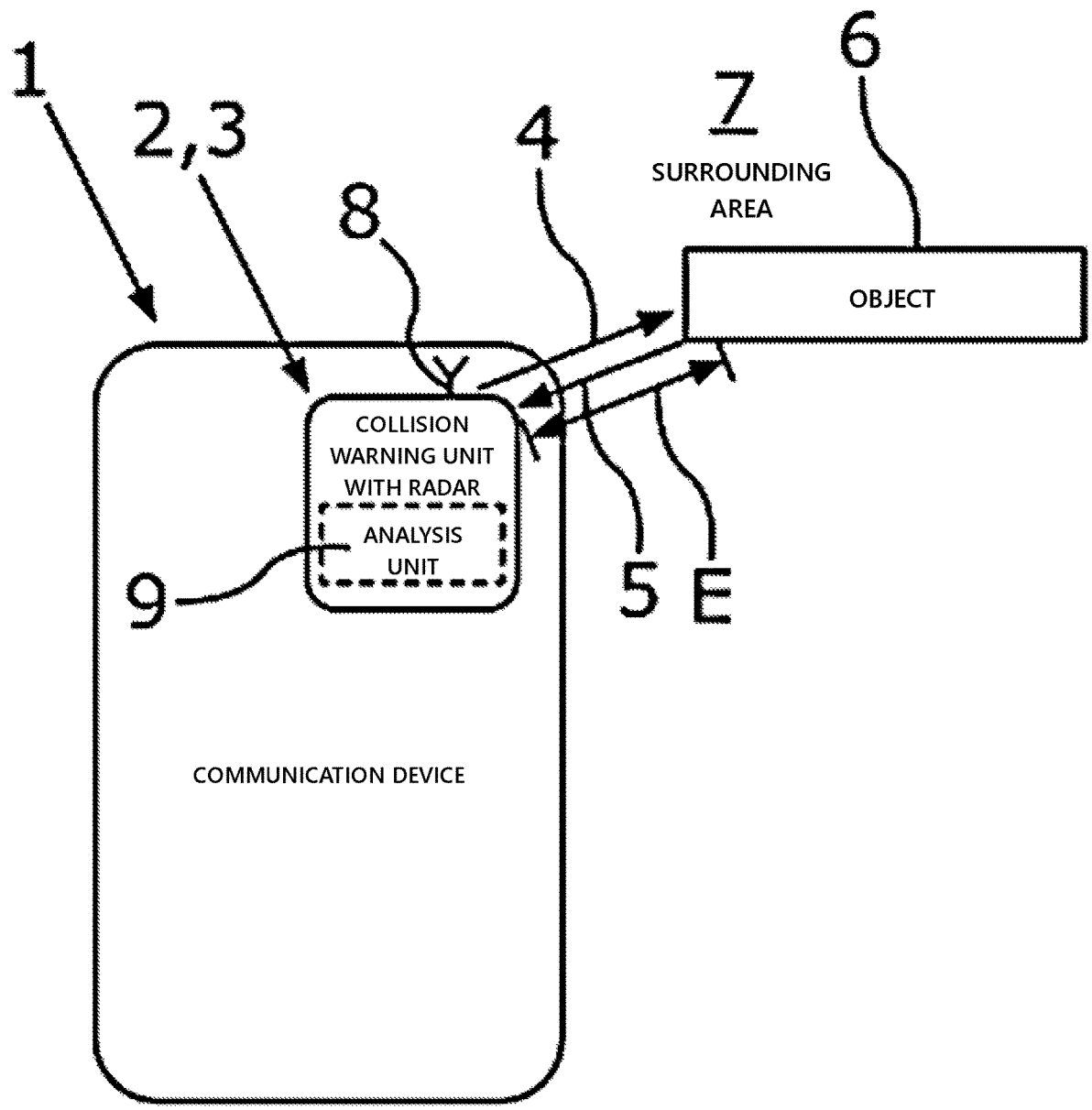
FIG. 1 is a schematic diagram of a mobile communications device comprising an integrated collision warning unit according to an exemplary embodiment of the disclosure.

The disclosure relates to a collision warning unit that is configured to emit a detection signal into a surrounding area and to receive at least one signal component reflected at an object in the surrounding area, and, depending on the received signal component, to output a collision warning signal. The disclosure also relates to a mobile communications device and to a method for collision warning.

There are many different known forms of collision warning systems especially in association with motor vehicles. These are based on using a suitable sensor system to sense an area surrounding the motor vehicle. It is possible to use as said sensor system, for instance, radars or laser scanners that are configured actively to emit a detection signal into the surrounding area and to detect objects in the surrounding area on the basis of reflected signal components. If a collision with the object is imminent according to a predetermined criterion, a warning signal to this effect may be output to the driver of the vehicle.

Such collision warning systems, however, are usually complex in design, expensive and require a large amount of installation space. This severely limits their potential uses.

The object of the present disclosure is therefore to disclose a possible way of providing collision warning in the most simple, efficient and inexpensive manner possible by means of a collision warning unit that may be designed for the most space-efficient installation possible.

This object is achieved by a collision warning unit, a mobile communications device and a method having the features given in the respective independent claims. The dependent claims, the description and the figures relate to advantageous embodiments of the disclosure.

A collision warning unit according to the disclosure is configured to emit a detection signal into a surrounding area and to receive at least one signal component reflected at an object in the surrounding area, and, depending on the received signal component, to output a collision warning signal. Said collision warning unit has a UWB (ultra-wideband) radar (radio detection and ranging) for transmitting the detection signal and receiving the reflected signal component.

The disclosure is based on several findings. One finding is that collision warning systems are advantageous not just in association with motor vehicles, but that such a collision warning unit may be advantageous particularly also for non-motorized road users, especially pedestrians, and may even save lives. Pedestrians are increasingly distracted by their mobile communications devices, and then, for instance when crossing a road, no longer pay attention to the surrounding traffic situation, fail to notice pedestrian lights, motor vehicles, or the like. A collision with a motor vehicle may quickly prove fatal for a pedestrian. Although it is not intended that the collision warning unit be provided solely for pedestrians, it nonetheless has numerous major advantages for this area of use. These may arise due to the use of an ultra-wideband radar, i.e. the UWB radar, for emitting and receiving the detection signals. Unlike conventional radar, ultra-wideband radar has a very large bandwidth, for instance in the region of 500 Megahertz. This in turn allows detection of extremely short distances from objects, in particular even in the centimeter range. At the same time, the range of such ultra-wideband radar is relatively short and, for example, has a maximum value of 30 meters, preferably of 15 meters. The detection range provided by such ultra-wideband radar may be optimal for applications involving pedestrians or cyclists or other road users moving at relatively low speed. For example, metallic objects such as motor vehicles may be detected reliably by such ultra-wideband radar because the radar signals are reflected strongly especially at metallic objects. In addition, by using an ultra-wideband radar, the collision warning unit may have an extremely low-cost and compact design, and hence may be integrated easily into a mobile communications device, for instance. The collision warning unit may be provided as a very small chipset, for example. Furthermore, the power required to operate the ultra-wideband radar is very low, which may mean that the collision warning unit may be integrated very easily, for example into a mobile communications device, or into another mobile device such as a vehicle key or the like, and may be operated by a battery or a rechargeable battery. Hence an ultra-wideband radar may advantageously provide opportunities, as yet unexploited, for collision warning, especially for pedestrians. The collision warning unit may hence be used in a highly versatile manner for collision warning, and accidents or collisions with other road users may thereby be avoided very efficiently or reduced in frequency.

In an advantageous embodiment of the disclosure, the UWB radar is configured to emit the detection signal repeatedly in the form of signal pulses at a predetermined time interval. For example, this time interval may equal one second or three seconds or five seconds, or the like. This time interval is preferably less than five seconds. A time interval of a few seconds is entirely sufficient especially for pedestrian uses because pedestrians typically move at comparatively low speed. Nonetheless, the time interval may also be less than one second. In addition, embodying the radar as a UWB radar means that it is possible to emit short signal pulses as detection signals. This in turn means that it is possible to sense even very small distances from objects.

Furthermore, it is highly advantageous if the collision warning unit is configured to adjust the time interval according to a current speed of movement of the collision warning unit. It is also preferred in this case that the higher the speed of movement of the collision warning unit, the shorter the time interval. Thus if a pedestrian is moving very slowly, then for example even large time intervals, for instance of three seconds or more, are sufficient to still provide early enough warning of a potential collision with another object. If the collision warning unit is being used by a cyclist, for instance, then in this case it may be advantageous if the time interval is significantly shorter. This embodiment advantageously may provide optimum adaptation to the situation. For example, the collision warning unit may be configured to use the UWB radar itself to sense its current speed of movement. Alternatively or additionally, other sensors may also be used for this purpose, for instance also sensors that are not themselves part of the collision warning unit, for example a sensor system for motion sensing provided in a mobile communications device, for example a gyro sensor or the like, if the collision warning unit is fitted in such a mobile communications device.

In a further highly advantageous embodiment of the disclosure, the collision warning unit has an analysis apparatus, which is configured to measure a time of flight between emission of the detection signal and reception of the signal component, and to determine a distance to the object on the basis of the measured time of flight, and, depending on the distance, to output the collision warning signal, for instance if the distance is less than a predetermined limit value. The time-of-flight measurement in particular is an especially simple way of determining the distance to the object. If a plurality of signal components are captured successively in time, then the time of flight is determined on the basis of the reflected signal component that is captured first. This consequently corresponds to the smallest distance from an object in the surrounding area, and therefore it is advantageously possible to give reliable warning of the spatially nearest object.

A relative speed with respect to the object may also be determined from successively emitted and correspondingly received signal components. Alternatively or additionally, a phase change between the emitted detection signal and the received signal component may also be used, for example, to determine a distance and/or speed relative to the object. In addition, the time of flight and/or the phase change may also be used, as described, to determine the aforementioned speed of movement of the collision warning unit itself.

In a further advantageous embodiment of the disclosure, the collision warning unit is configured to ascertain a change in distance of moving objects by means of a phase change between two pulses. As mentioned above, a phase change between two emitted pulses and their successively received signal components may be used to determine a change in distance, i.e. a change in distance over time, from one of the plurality of moving objects in the surrounding area. It is in turn possible to derive from this change in distance a speed of movement of the object(s). The change in distance and/or the speed of movement may then be taken into account advantageously in determining a risk of collision and in the output of the collision warning signal.

In a further advantageous embodiment of the disclosure, the UWB radar has an antenna for transmitting a detection signal and for receiving the reflected signal component. This constitutes a particularly efficient and inexpensive embodiment because a single antenna is sufficient both for emitting the detection signal and for capturing the reflected signal component. Since the detection signals may be emitted anyway at very large time intervals, in particular in the range of seconds, especially when used for pedestrians, single antennas may be used particularly effectively for both transmitting and receiving in alternation. This may be done, for example, by providing measuring time windows that correspond to the time intervals. The intervals between the emitted detection signal pulses are hence entirely sufficient for capturing reflected signal components.

In particular when the UWB radar has an antenna for transmitting and receiving the detection signal, it is advantageous if the UWB radar also has a switching apparatus for switching the antenna between a transmit unit, which is configured to stimulate the antenna to emit the detection signal, and a receive unit, which is configured to capture the signal component received by the antenna. Said switching apparatus is preferably in the form of a simple switch, in particular a semiconductor switching element. Alternatively, however, a circulator could also be used for this purpose.

In a further advantageous embodiment of the disclosure, the UWB radar has at least two antennas, wherein at least one of the antennas is configured to transmit the detection signal, and at least one of the antennas is configured to receive the reflected signal component. It is conceivable in this case, for example, that one antenna is provided solely for transmitting and one solely for receiving. It is then possible to dispense with a switching apparatus, for example.

It is particularly advantageous, however, if each of the at least two antennas is configured to transmit the detection signal and to receive the reflected signal component. This has several advantages. For example, this allows an increase overall in the measurement accuracy. Furthermore, the two antennas may be mutually spaced at a predetermined spatial separation. Knowledge of this spatial separation of the antennas may be used to determine, for example on the basis of time-of-flight differences, a direction in which the object lies that is reflecting the detection signals. Hence, for instance, the collision warning unit may be configured not just to output a collision warning signal but also, for example, directional information about the detected object. In particular if the collision warning unit is integrated in a mobile communications device, for example, said directional information may be output by means of a corresponding indicator on a display of the mobile communications device of the user, for instance in a pop-up window. For example, this may immediately prompt the user to look in the direction from which the danger threatens in order to avert this danger in time. Providing at least two antennas has yet another major advantage especially when the collision warning unit is used in a mobile communications device. If a user is holding the mobile communications device, for instance a smartphone, in his hand, then the hand of the user may sometimes attenuate or impair the emission of the detection signal from an antenna. If, however, two antennas are used that are arranged, for example, at a largest possible separation inside the mobile communications device or at least at different positions, for instance on a top edge region and a bottom edge region, then this increases the probability that at least one of the detection signals emitted by the two antennas may be emitted at sufficient strength even if the user is currently holding the mobile communications device in his hand. The same also applies to receiving the reflected signal component.

Moreover, it is advantageous in particular when the UWB radar has a plurality of antennas for said radar to have a circulator in order to ensure the transmission and reception of the signals. It is hence possible to use a shared transceiver for both antennas, which means that the collision warning unit may be provided at extremely low cost, efficiently and in the minimum amount of installation space.

In addition, the disclosure also relates to a mobile communications device comprising a collision warning unit according to the disclosure or one of its embodiments. The advantages specified for the collision warning unit according to the disclosure and its embodiments hence apply similarly to the mobile communications device.

As explained, the advantages of the collision warning unit according to the disclosure and its embodiments may be especially great in the context of use in a mobile communications device such as a smartphone. Nonetheless, the collision warning unit according to the disclosure and its embodiments are not intended to be limited to use in a mobile communications device. For example, a motor vehicle comprising a collision warning unit according to the disclosure or one of its embodiments shall be deemed to be within the scope of the disclosure.

In addition, the disclosure also relates to a method for collision warning, wherein a detection signal is emitted into a surrounding area, and at least one signal component reflected at an object in the surrounding area is received, and, depending on the received signal component, a collision warning signal is output. The detection signal is output as a UWB signal by means of a UWB radar, and the reflected signal component is captured by means of the UWB radar.

Again in this case, the advantages mentioned in connection with the collision warning unit according to the disclosure and its embodiments apply similarly to the method according to the disclosure.

The disclosure also includes developments of the method according to the disclosure which have features as already described in connection with the developments of the collision warning unit according to the disclosure. For this reason, the corresponding developments of the method according to the disclosure are not described here again.

The disclosure also comprises the combinations of the features of the described embodiments.

The exemplary embodiment explained below is a preferred embodiment. In the exemplary embodiment, the described components of the embodiment each represent individual features of the disclosure that should be considered independently of one another and that each also develop independently of one another and may therefore also be considered to be part of the disclosure individually or in a combination other than that shown. Furthermore, the embodiment described may also be supplemented by further features of the disclosure that have already been described.

In the figures, elements with the same function are each provided with the same reference signs.

FIG. 1 shows a schematic diagram of a mobile communications device 1 comprising an integrated collision warning unit 2, which comprises a UWB radar 3, according to an exemplary embodiment. The mobile communications device 1 may be, for example, a smartphone or else a vehicle key for a motor vehicle. The UWB radar 3 is configured to emit repeatedly a detection signal 4, and to capture at least one reflected signal component 5 of this signal 4, which has been reflected at an object 6 in a surrounding area 7 of the collision warning unit 2 and in particular of the mobile communications device 1. For the emission of the detection signal 4, the UWB radar 3 has at least one antenna 8 for this purpose. This may be configured and used to both transmit and receive. Optionally, however, the radar 3 may also comprise at least one further antenna 8, although this is not shown here. In this case, for example, one antenna 8 may be used for transmitting and the other for receiving signals 4, 5, or both antennas 8 may be configured and used both for transmitting and for receiving signals 4, 5. When a plurality of antennas 8 are present, these are preferably arranged at positions on the mobile communications device 1, for instance a smartphone, that are as different as possible. For example, one antenna 8 may be located in the top half of the mobile communications device 1, and the other in the bottom half. Similarly, it would also be possible to provide one antenna 8 in the left-hand half, and one in the right-hand half of the mobile communications device 1. This increases the probability of detecting objects 6 in the surrounding area 7, even when, for example, an antenna 8 is covered by the hand of a user who is currently using his mobile communications device 1.

The UWB radar 3 is configured to emit ultra-wideband detection signals 4, for instance having a bandwidth of 500 Megahertz. It is thereby possible to provide very short signal pulses, which in turn allows the detection of objects 6 even at very short distances, for instance even in the centimeter range. A collision warning unit of this type that is integrated in a mobile communications device 1 may hence be used particularly advantageously to warn the user of, for example, an accident or a collision with other road users, in particular with motor vehicles. In particular metallic objects 6 may be detected particularly effectively by means of a UWB radar 3 of this type because the reflected signal component 5 is hence particularly large, i.e. has a large amplitude. Especially users of mobile communications devices are often strongly distracted by their mobile communications device from the current traffic situation around them, for instance when writing or reading SMS messages, by social networks, calls or other various operations on the mobile communications device 1. Thus when using conventional mobile phones without an integrated collision warning unit 2 it may happen that a pedestrian is accordingly no longer paying attention to the road and, for example, is hit by a car or runs into a wall. Advantageously, the collision warning unit 2 integrated in the mobile phone 1 may now prevent this, or at least reduce its likelihood.

The reflected signal components 5 captured by the radar 3, for example by the antenna 8, may be analyzed by an analysis unit 9 of the collision warning unit. It may be determined from the reflected signal components 5 whether an object 6 is located in the immediate surrounding area of the mobile communications device 1 or generally in the vicinity of the collision warning unit 2. If this is the case, and, for example, this object 6 is less than a specified distance from the collision warning unit 2, the analysis apparatus 9 may prompt the output of a collision warning signal. For example, in this case, the analysis apparatus 9 may transfer said collision warning signal also to another, for instance central, control device of the mobile communications device 1, which control device prompts, for example, the output of a warning tone or a warning indicator on a display of the mobile communications device 1. If the radar 3 comprises a plurality of antennas 8, for example, then it is possible, for instance, to determine not only the distance to the sensed object 6 but also its direction in relation to the mobile communications device 1 or a defined orientation of the mobile communications device 1. In this case, the direction in which the detected object 6, or the danger, lies may be indicated to the user of the mobile communications device 1 also on the display of the mobile communications device 1.

Figure 2:
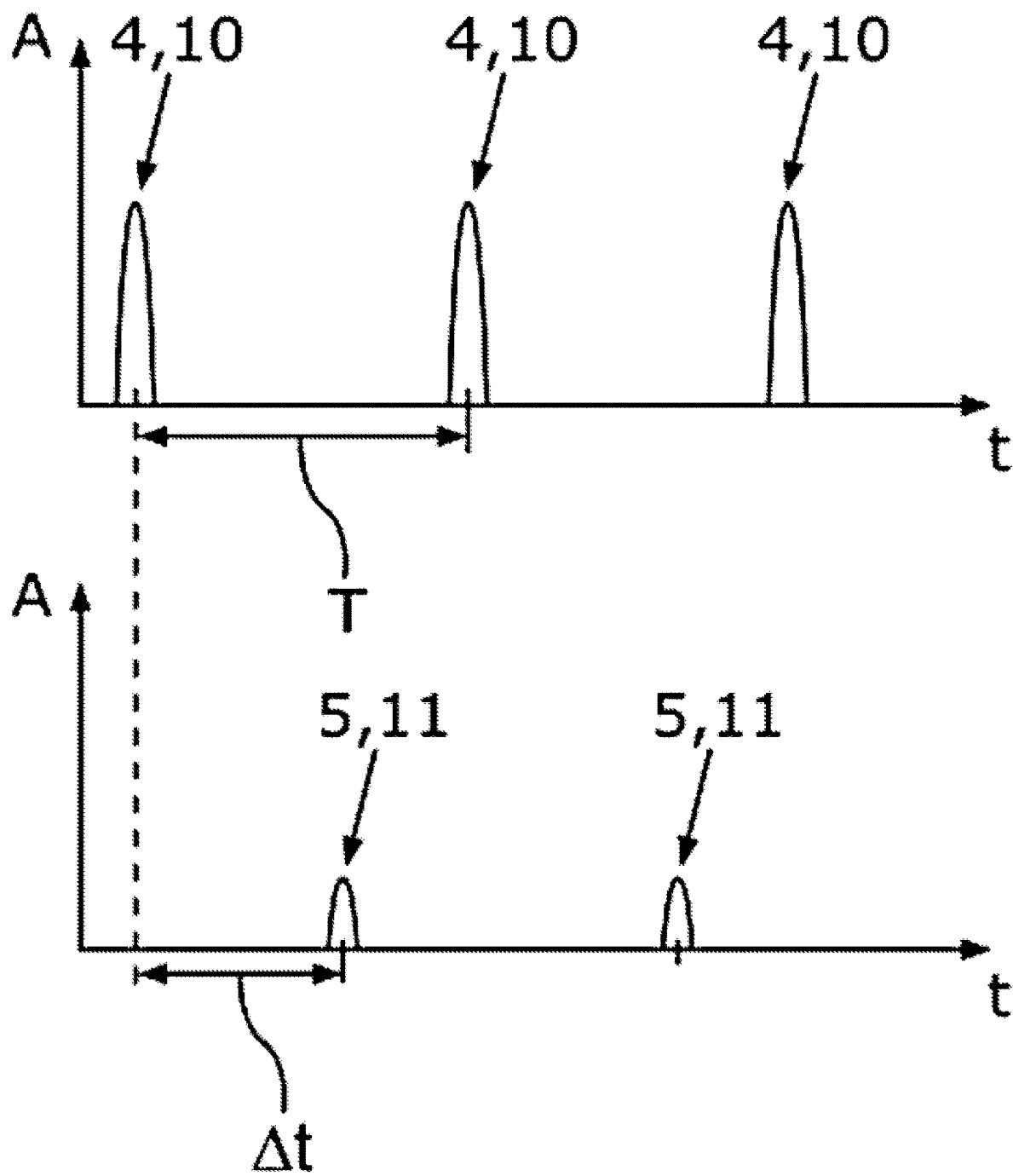
FIG. 2 is a schematic diagram of the detection pulses emitted by the collision warning unit, and the reflected signal components received by the collision warning unit for determining a distance from an object according to an exemplary embodiment of the disclosure.

One possible way of determining the distance of said object 6 from the collision warning unit 2 shall now be explained in greater detail with reference to FIG. 2. FIG. 2 shows in the top graph the variation over time of the amplitude A of the detection signal 4 emitted by the radar 3, which is emitted repeatedly in the form of temporally spaced emitted signal pulses 10. Here the time axis is labeled t. In this example, the pulses 10 are mutually spaced by a time interval T. This may equal one second or three seconds or five seconds, for example. This may also be governed, for instance, by the current speed of movement of the collision warning unit 2. The pulse length of the signal pulses 10 is significantly shorter here than the time interval T, allowing the detection of objects 6 even at a very short distance from the UWB radar 3.

FIG. 2 shows in the bottom graph the signal components 5 received by the radar 3. More precisely, this again shows the variation over time in the amplitude A of the received signal 5. Again this is in the form of individual received signal pulses 11. The distance to the object 6 may be determined easily from the sensed time of flight Δt, i.e the time that lies between emission of a detection pulse 10, in the present example the first detection pulse 10 from the top graph, and reception of the first reflected pulse 11. The emitted signal has accordingly traveled during this time of flight Δt twice the path length E (cf. FIG. 1) for the path from the antenna 8 to the object 6 and back to the antenna 8. The distance E may accordingly be determined as follows from the sensed time of flight Δt:

$$E = 0.5 \cdot c \cdot \Delta t$$

where c is the speed of light.

In this case, after the emission of a pulse 10, it is always the pulse 11 received next in time that is used to determine the time of flight Δt. This ensures that a warning may always be given for the nearest object 6.

Overall, the examples show how, by means of mobile handheld devices such as mobile phones or car keys, various embodiments may avoid collisions and accidents, for instance by these devices comprising a collision warning unit which comprises a UWB radar and which allows particularly simple and efficient detection of objects in the immediate surrounding area and warning thereof. Thus a mobile hand-held device preferably has an integrated UWB radar system, and may transmit a signal, and receive the first reflected signal via a, likewise integrated, antenna system, and hence determine the distance or speed from the time of flight or the phase change. If the distance lies within a previously specified interval, a collision alarm may be output by means of a warning signal or pop-up window on the screen, a vibration or the like. This may provide an extremely low-cost way of avoiding accidents and collisions.

The invention claimed is:

1. A collision warning unit configured to be integrated into a vehicle key and to emit a detection signal into a surrounding area at the vehicle key and to receive at the vehicle key at least one signal component reflected at an object in the surrounding area, and, depending on the received signal component, to output a collision warning signal,
    wherein the collision warning unit has comprises an ultra-wideband radar integrated therein for transmitting the detection signal and receiving the reflected signal component.
2. The collision warning unit as claimed in claim 1,
    wherein the ultra-wideband radar is configured to emit the detection signal repeatedly in form of signal pulses at a predetermined time interval.
3. The collision warning unit as claimed in claim 2,
    wherein the collision warning unit is configured to adjust the time interval according to a current speed of movement of the collision warning unit.
4. The collision warning unit as claimed in claim 1,
    wherein the collision warning unit has an analysis apparatus, which is configured to measure a time of flight between emission of the detection signal and reception of the signal component, and to determine a distance to the object based on the measured time of flight, and, depending on the distance, to output the collision warning signal.
5. The collision warning unit as claimed in claim 1,
    wherein the collision warning unit is configured to ascertain a change in distance of moving objects by a phase change between two pulses.
6. The collision warning unit as claimed in claim 1,
    wherein the ultra-wideband radar has an antenna for transmitting the detection signal and for receiving the reflected signal component.
7. The collision warning unit as claimed in claim 1,
    wherein the ultra-wideband radar has an antenna for transmitting the detection signal and for receiving the reflected signal component, which ultra-wideband radar has a switching apparatus for switching the antenna between a transmit unit, which is configured to stimulate the antenna to emit the detection signal, and a receive unit, which is configured to capture the signal component received by the antenna.
8. The collision warning unit as claimed in claim 1,
    wherein the ultra-wideband radar has at least two antennas, wherein at least one of the antennas is configured to transmit the detection signal, and at least one of the antennas is configured to receive the reflected signal component.
9. The collision warning unit as claimed in claim 8,
    wherein each of the at least two antennas is configured to transmit the detection signal and to receive the reflected signal component.
10. A mobile communications device comprising a collision warning unit as claimed in one claim 1.
11. A method for collision warning, wherein a detection signal is emitted at a vehicle key into a surrounding area, and at least one signal component reflected at an object in the surrounding area is received at the vehicle key, and, depending on the at least one signal component received, a collision warning signal is output at the vehicle key,
    wherein the detection signal is output as an ultra-wideband signal by a ultra-wideband radar comprised in and integrated into the vehicle key, and the reflected signal component is captured by the ultra-wideband radar comprised in and integrated into the vehicle key.
12. The collision warning unit as claimed in claim 3,
    wherein the collision warning unit is configured to use the ultra-wideband radar to sense current speed of movement of the collision warning unit.
13. The vehicle key comprising a collision warning unit as claimed in one claim 1.

* * * * *